Jan 6, 1931.  O. U. ZERK  1,787,741
LUBRICATING SYSTEM
Filed Aug. 1, 1925   2 Sheets-Sheet 1
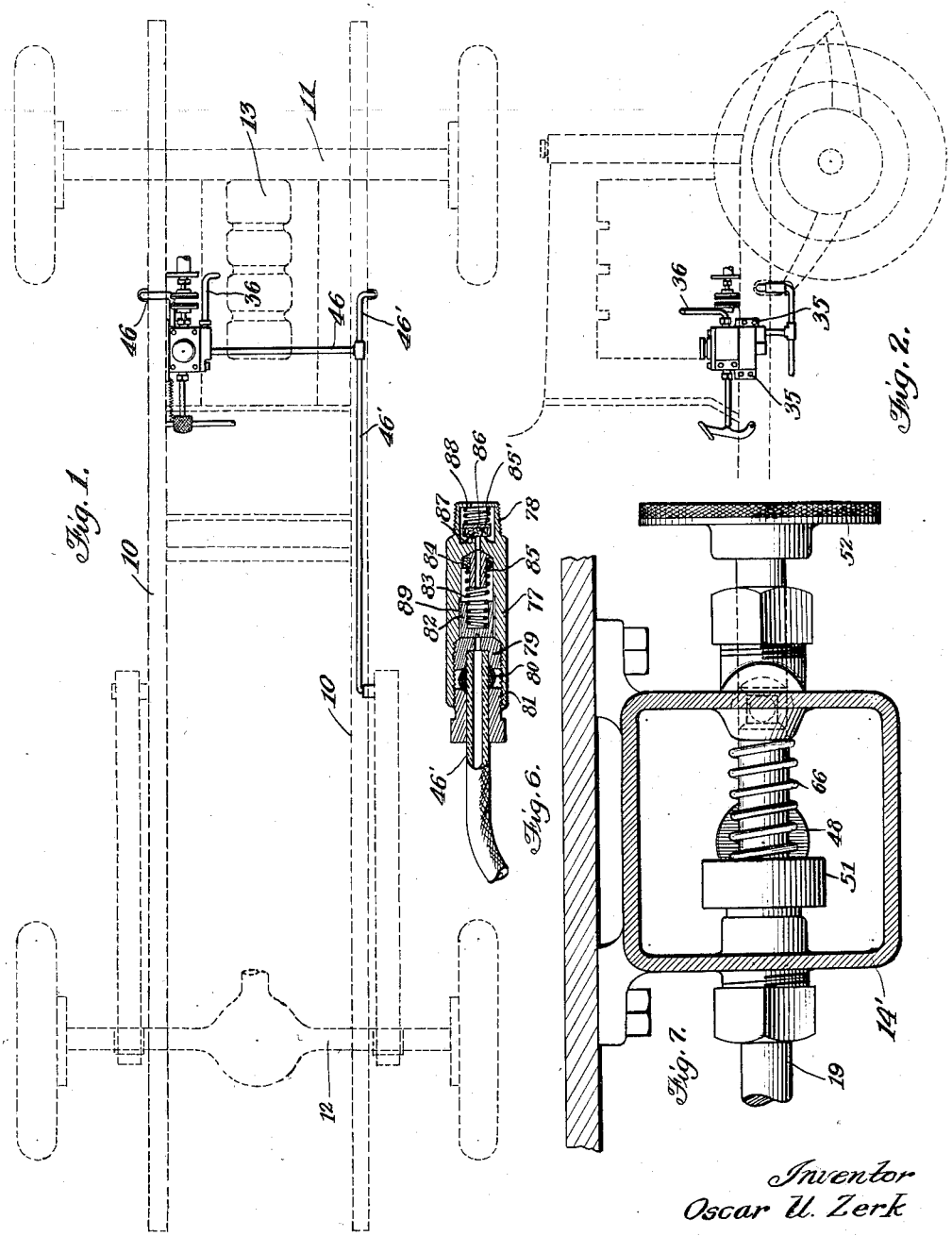
Inventor
Oscar U. Zerk
By Pierce & Sweet
Attys.

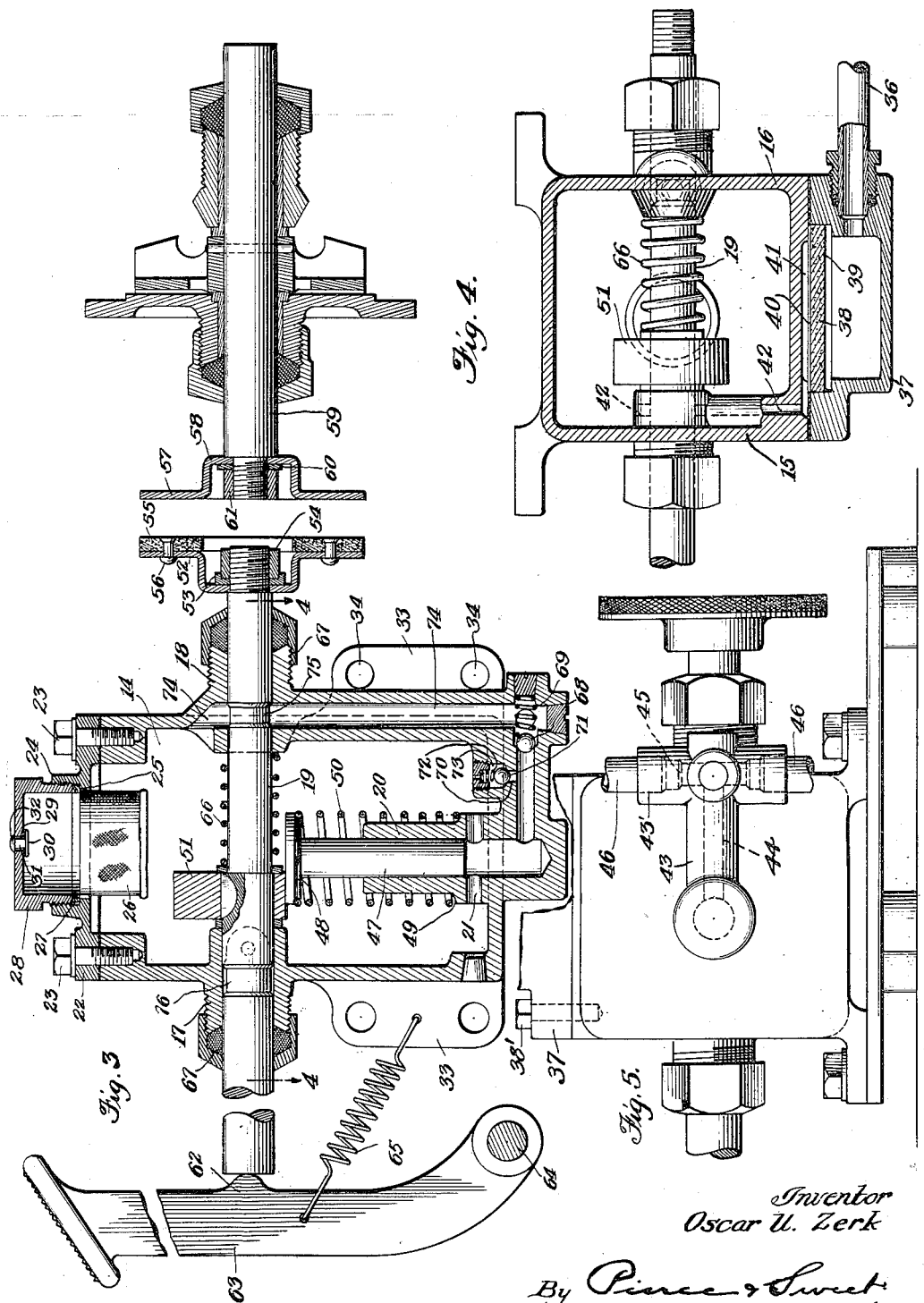

Patented Jan. 6, 1931

1,787,741

UNITED STATES PATENT OFFICE

OSCAR ULYSSES ZERK, OF CHICAGO, ILLINOIS, ASSIGNOR, BY MESNE ASSIGNMENTS, TO ALEMITE CORPORATION, OF CHICAGO, ILLINOIS, A CORPORATION OF DELAWARE

LUBRICATING SYSTEM

Application filed August 1, 1925. Serial No. 47,565.

My invention relates to improvements in lubricating systems and is particularly concerned, though not necessarily limited, with the provision of a novel lubricating system for the chassis of automotive vehicles.

The objects of my present invention are:

First to provide a power driven, manually controlled lubricating system for supplying lubricant to the various bearings of a chassis;

Second, to provide a power operated lubricating system, comprising a pump that is normally disconnected from the source of power, and means whereby the pump can be momentarily connected in driving relation with the engine of the vehicle;

Third, to provide a lubricating system, such as described, that embodies means for preventing an over-supply of lubricant to the bearings, but which comprises means for preventing damage to any portion of the system in the event the system is continued in operation for a longer period of time than is necessary for properly lubricating the bearings;

Fourth, to provide a lubricating system in which the supply of lubricant can either be withdrawn from a separate supply chamber or from the crank case of the engine. In the latter case means are provided for removing dirt and sediment from the oil before it is forced into the chassis bearings.

Fifth, to provide a lubricating system, such as described, that is readily convertible into either type.

Sixth, to provide a lubricating system, of the character described, embodying certain other features for controlling the supply of lubricant to the bearings that will be referred to as this description progresses, reference being had to the accompanying drawings, in which:

Figure 1 is a plan of one embodiment of my invention shown in connection with an automobile chassis, indicated in dotted outline;

Figure 2 is a side elevation of the construction shown in Figure 1, portions thereof being broken away;

Figure 3 is a vertical, central section through one embodiment of the pump forming a part of my improved system and a portion of a conventional water pump, the shaft of which is utilized as a driving shaft for the pump of my system;

Figure 4 is a transverse section taken on line 4—4 of Figure 3;

Figure 5 is a bottom view of Figure 3;

Figure 6 is a longitudinal, sectional detail of the devices that are secured to the bearings for limiting the quantity of oil supplied to each bearing; and Figure 7 is a view similar to Figure 4, illustrating a modified form of my invention.

Throughout the several views similar reference characters are used for referring to similar parts and the several sections are taken looking in the directions of the small arrows.

Referring to the drawings, and for the time being to Figures 1 to 6, inclusive, I have illustrated my invention in combination with a chassis of an automotive vehicle comprising the side frame members 10, the front and rear axles 11 and 12, respectively, and an engine 13. The portions of the chassis shown in dotted outline are purely conventional in form and may, of course, be varied or modified as desired.

The embodiment of my invention shown in Figures 1 to 6, inclusive, includes, in general, a pump for receiving oil from the crank case of the engine and delivering it to the various bearings to be lubricated, suitable means, such as that shown in Figure 6, being provided for limiting and determining the quantities of lubricant supplied to the several bearings. Means are employed for connecting the pump with a moving portion of the engine, or some part of the chassis driven by the engine, these means being manually controllable so that lubrication of the chassis bearings can be effected by the operator at any time.

Reference has already been made to the fact that in one embodiment of my invention the oil is withdrawn from the crank case of the engine. By this it should be understood that my invention contemplates either the withdrawal of oil from the crank case by gravity, or the oil may be withdrawn from the crank case by the pump that is almost universally employed for lubricating the bearings of the engine and supplied by this pump to the pump forming a part of my system, or a separate pump may be employed for withdrawing oil from the crank case and supplying it to the pump forming a part of my system. Wherever in this specification and claims reference is made to the connection between the crank case and the pump forming a part of my system, it is to be understood that this connection may be any one of the arrangements described above, or any equivalent arrangement.

The pump forming a part of my system comprises a supply chamber 14, having the oppositely disposed side walls 15 and 16 in which are formed bearings 17 and 18 for receiving the pump shaft 19. A pump cylinder 20 is formed integrally with the bottom wall of the supply chamber and has inlet ports 21 through which the oil passes from the supply chamber to the pump cylinder. The supply chamber is provided with a suitable cover 22 that is secured to the supply chamber by screws 23. The cover 22 has a filling opening 24, at the bottom of which is an inwardly extending flange 25 for supporting the filter element 26. This filter element has a rim 27 that is clamped between the flange 25 and the inner edge of the hollow plug 28. This plug is threaded into the filling opening and is provided with a vent 29 that is normally open but which is automatically closed by the valve 30 when the level of the oil in the supply chamber reaches the bottom of the valve 30. The valve 30 has a stem 31 that extends loosely through the vent opening 29 and which is provided, at its outer end, with a head 32 that prevents the valve from dropping.

Suitable brackets 33, formed integrally with the supply chamber, are used for securing the pump to one of the side members of the chassis, openings 34 being formed in these brackets for receiving screws or bolts 35.

In the embodiment of my invention shown in Figures 1 to 6, inclusive, oil is furnished to the supply chamber through the conduit 36, one end of which is connected with the crank case of the engine, as described above, and the opposite end of which is connected with the housing 37. This housing is secured to one side of the supply chamber by means of screws 38', or in any other suitable manner, and a filter unit, comprising the filter element 38 of felt, or other suitable material, and the perforated stamping 39, is clamped between the housing and the supply chamber, lugs 40 being formed on the side of the supply chamber so as to provide passageways 41 for the filtered oil. These passageways connect with another passageway 42, formed in the wall 15 of the supply chamber. The latter passageway intercepts and is interrupted by the bore of the bearing 17 for a purpose that will later be referred to.

The bottom wall of the supply chamber has a boss 43, formed integrally therewith, in which is formed the discharge passageway 44. This passageway communicates with another passageway 45 formed in the T portion 43' of the boss 43. Conduits 46, communicating with the opposite ends of the passageway 45, lead to the various bearings to be lubricated. These conduits may be branched, as shown at 46', so that each conduit may supply a plurality of bearings. It will, of course, be understood that bearings other than those illustrated in the drawings can be supplied with oil by means of such conduits, or branch conduits, and that provision can be made for connecting more than two conduits with the passageway 45.

For discharging the lubricant from the cylinder 20, I provide the plunger 47, having the enlarged head 48, between which and the shoulder 49, on the cylinder 20, is confined the compression spring 50. This spring tends to move the plunger out of the cylinder 20. A cam 51, keyed to the shaft 19, when rotated, moves the plunger 47 in the opposite direction.

One end of the shaft 19 extends outwardly beyond the wall of the supply chamber and carries a clutch element comprising the disc 52, that is centrally depressed to house the washer 53 and the nut 54 that are used for clamping the disc 52 to the end of the shaft 19. A ring 55, of fibre or other suitable friction material, is secured to the disc 52 by means of rivets 56. A corresponding disc 57, having the central depression 58, is secured to the pump shaft 59 by means of the washer 60 and nut 61.

In order to bring the friction ring 55 into contact with the disc 57, I extend the opposite end of the shaft 19 beyond the adjacent wall of the supply chamber and into contact with the lug 62 on the foot lever 63. This lever may be pivoted, as shown at 64, to any suitable part of the chassis. A spring 65, connected with the lever 63 and one of the brackets 33, provides means for yieldingly holding the lug 62 in contact with the adjacent end of the shaft. For holding the shaft in its normal inoperative position, shown in Figure 3, I provide the compression spring 66 that is confined between one wall of the supply chamber and the cam 51. This spring has greater tension than the spring 65. Suitable bushings 67 may be used for preventing the escape of oil along the shaft 19.

A suitable check valve 68 is yieldingly held against a seat in the discharge passageway 44 by means of the spring 69 and prevents return flow of oil to the cylinder 20 when the plunger 47 is on its return stroke. A port 70, extending between the discharge passageway 44 and the supply chamber, is closed by the valve 71 that is yieldingly held in its closed position by means of the spring 72, confined between the valve 71 and the hollow plug 73. The tension of the spring 72 is such that the valve 71 will not open until the pressure on the oil in the passageway 44 reaches a predetermined degree greater than that required for operating the distributing devices shown in Figure 6. These devices are so constructed that for proper operation the pressure upon the oil in the conduits leading to them must be relieved each time they are intended to operate, and this release of pressure takes place through the passageway 74, formed in the wall 16 of the supply chamber, and establishes communication between the passageway 45 and the interior of the supply chamber. The passageway 74 intercepts and is interrupted by the bore of the bearing 18, as shown in Figure 3. The shaft 19 has formed therein an annular groove 75 which, in the position of the shaft 19 shown in Figure 3, establishes communication between the two portions of the passageway 74, so that any pressure on the oil in the conduit 45 can be relieved through this passageway. When, however, the shaft is pushed to the right sufficiently to bring the fibre ring 55 into contact with the disc 57, the groove 67 is moved sufficiently to the right to interrupt communication between the two portions of the passageway 74. When the ring 55 is in contact with the disc 57, the shaft 19 will be rotated and the spring 50 and cam 51 will effect reciprocation of the plunger 47. This results in oil being discharged through the passageway 44 and conduits 46 and 46' to the various bearings. At this time, as described above, the passageway 74 will be closed by the shaft 19 so that no oil can pass through this passageway.

When the shaft is in the position just described, the annular ring 76 will establish communication between the two portions of the passageway 42, so that oil can flow from the crank case into the supply chamber 14. If this supply of oil should continue until the latter becomes filled, the valve 30 will rise and close the vent 29 so that thereafter no more oil can be supplied to the chamber 14 than is discharged through the passageway 44. When pressure upon the lever 63 is released, the shaft 19 will move to the left, under the tension of the spring 66, until it occupies the position shown in Figure 3, whereupon pressure in the several conduits 46 and 46' will be relieved, as described above, and the supply of oil from the crank case to the supply chamber will be interrupted.

One of the devices for determining the quantity of lubricant fed to each of the bearings upon each operation of the pump is shown in longitudinal section in Figure 6 and specifically described in my co-pending application, Serial No. 47,568, filed August 1, 1925.

This device comprises an elongated body member 77, having a central bore therethrough. One end of the device is provided with screw threads 78, for securing it to the bearing to be lubricated, and the other end is internally threaded for receiving the valve seat 79 and the compressible member 80 and follower 81 that are used for securing one end of a branch conduit 46'. A piston valve 82 is reciprocably mounted in the bore of the body member and is yieldingly held against the valve seat 79 by means of the compression spring 83. A gasket 84 is held in proper position by the opposite end of the spring 83 and a guide tube 85 prevents displacement of the spring. A check valve, comprising the fibre disc 85' and the metal disc 86, is yieldingly held against the valve seat 87 by means of the compression spring 88. One or more by-pass grooves 89 are formed in the wall of the bore of the body member and extend from a point adjacent the valve seat to a point inwardly beyond the opposite end of the piston valve.

In operation, when the pump described above forces lubricant, under pressure, through the branch conduits 46', the piston valve 82 is moved toward the gasket 84 until it effects a sealing contact with this gasket. In this movement the piston discharges, through the guide tube and past the check valve 85, a portion of the oil that has previously by-passed the piston valve. When pressure upon the oil in the branch conduit 46' is relieved, the spring 83 gradually returns the piston valve to its normal position. While the piston valve is returning to this position and as soon as its inner end uncovers the inner ends of the by-passes 89, oil will flow to the inner side of the piston valve to replace the oil previously discharged. As soon as the piston valve makes contact with the valve seat 79, this flow of oil is interrupted.

From the above description it will be apparent that by alternately placing the oil in the conduits 46' under pressure and then relieving the pressure, the devices, such as shown in Figure 6, will be caused to discharge successive charges of oil into contact with the bearings to be lubricated.

The means just described for limiting and determining the quantity of oil supplied to a bearing may be replaced by any other suitable means now well known to those skilled in this art.

In Figures 1 and 2 my lubricating system is illustrated as comprising means for supplying lubricant to the rear shackles of the front springs and to the front shackles of the rear springs, but it will, of course, be understood that it can be used for supplying oil to any of the chassis bearings.

In Figure 7 I have illustrated a modified form of my invention, in which the means for filtering the supply of oil to the supply chamber is omitted. This form of my invention is intended to be self-contained, in that the supply of oil will initially be poured into the supply chamber 14'. This, of course, eliminates the necessity for the passageway 42. Otherwise, the construction is similar to that described above.

While I have described the preferred embodiments of my invention, it is to be understood that my invention is not limited to these details of construction, but is capable of other adaptations and modifications within the scope of the appended claims.

Having thus described my invention, what I claim is:

1. The combination with an automotive vehicle comprising a chassis having a bearing to be lubricated, an engine mounted on said chassis, and a shaft driven by said engine, of means connected with said bearing for periodically delivering charges of oil to said bearing and a pump for supplying oil to said delivering means, said pump comprising a supply chamber having oppositely disposed bearings formed therein, a pump cylinder formed integrally therewith, a plunger reciprocable in said cylinder, a second shaft journaled in said bearings and having its ends projecting beyond said bearings, clutch means for connecting one end of said second shaft with one end of said first mentioned shaft, means for reciprocating said second shaft, a cam on said second shaft for operating said plunger, a conduit connecting said pump cylinder with said delivering means, and a second conduit for connecting said supply chamber with the crank case of said engine, said second shaft embodying two valve means, one of which controls communication between said crank case and said supply chamber and the other of which relieves the pressure in the conduit extending from said pump cylinder to said delivering means.

2. The combination with an automotive vehicle, comprising a chassis having a bearing to be lubricated, an engine mounted on said chassis, and a shaft driven by said engine, of means connected with said bearing for periodically delivering charges of oil to said bearing and a pump for supplying oil to said delivering means, said pump comprising a supply chamber having oppositely disposed bearings formed therein, a pump cylinder, a plunger reciprocable in said cylinder, a second shaft journaled in said bearings, clutch means for connecting said second shaft with said first mentioned shaft, a cam on said second shaft for operating said plunger, a conduit connecting said pump cylinder with said delivering means, and a second conduit for connecting said supply chamber with the crank case of said engine, said second shaft embodying two valve means, one of which controls communication between said crank case and said supply chamber and the other of which relieves the pressure in the conduit extending from said pump cylinder to said delivering means.

3. The combination with an automotive vehicle comprising a chassis having a bearing to be lubricated, an engine mounted on said chassis, and a shaft driven by said engine, of means connected with said bearing for periodically delivering charges of oil to said bearing and a pump for supplying oil to said delivering means, said pump comprising a supply chamber having oppositely disposed bearings formed therein, a pump cylinder, a plunger reciprocable in said cylinder, a second shaft journaled in said bearings, clutch means for connecting said second shaft with said first mentioned shaft, a cam on said second shaft for operating said plunger, a conduit connecting said pump cylinder with said delivering means, and a second conduit for connecting said supply chamber with the crank case of said engine.

4. The combination with an automotive vehicle comprising a chassis having a bearing to be lubricated, an engine mounted on said chassis, and a shaft driven by said engine, of a pump for supplying lubricant to said bearing, said pump comprising a supply chamber in communication with the crank case of said engine, a pump cylinder, a conduit connecting said cylinder with said bearing, a plunger reciprocable in said cylinder, means for reciprocating said plunger, comprising a second shaft, clutch means for connecting said second shaft with said first named shaft, means for reciprocating said second shaft, and means controlled by the reciprocation of said second shaft for effecting communication between said crank case and said supply chamber and for relieving the pressure in said conduit.

5. The combination with an automotive vehicle comprising a chassis having a bearing to be lubricated, an engine mounted on said chassis, and a shaft driven by said engine, of a pump for supplying lubricant to said bearing, said pump comprising a supply chamber in communication with the crank case of said engine, a pump cylinder, a conduit connecting said cylinder with said bearing, a plunger reciprocable in said cylinder, means for reciprocating said plunger, comprising a second shaft, clutch means for connecting said second shaft with said first named shaft, and means controlled by said second shaft for effecting communication between said crank case and said supply chamber and for relieving the pressure in said conduit.

6. The combination with an automotive vehicle compirsing a chassis having a bearing to be lubricated, an engine mounted on said chassis, and a shaft driven by said engine, of a pump for supplying lubricant to said bearing, said pump comprising a supply chamber in communication with the crank case of said engine, a pump cylinder, a conduit connecting said cylinder with said bearing, a plunger reciprocable in said cylinder, means for reciprocating said plunger, comprising a second shaft, clutch means for connecting said second shaft with said first named shaft, and means controlled by said second shaft for effecting communication between said crank case and said supply chamber.

7. The combination with an automotive vehicle comprising a chassis having a bearing to be lubricated, an engine mounted on said chassis, and a shaft driven by said engine, of a pump for supplying lubricant to said bearing, said pump comprising a supply chamber in communication with the crank case of said engine, a pump cylinder, a conduit connecting said cylinder with said bearing, a plunger reciprocable in said cylinder, means for reciprocating said plunger, comprising a second shaft, clutch means for connecting said second shaft with said first named shaft, and means controlled by said second shaft for relieving the pressure in said conduit.

8. The combination with an automotive vehicle comprising a chassis having a bearing to be lubricated, an engine mounted on said chassis, and a shaft driven by said engine, of a pump for supplying lubricant to said bearing, said pump comprising a pump cylinder, a conduit connecting said cylinder with said bearing, a plunger reciprocable in said cylinder, means for reciprocating said plunger, comprising a second shaft, clutch means for connecting said second shaft with said first named shaft, and means controlled by the reciprocation of said second shaft for effecting communication between the crank case of said engine and said cylinder and for relieving the pressure in said conduit.

9. The combination with an automotive vehicle comprising a chassis having a bearing to be lubricated, an engine mounted on said chassis, and a shaft driven by said engine, of a pump for supplying lubricant to said bearing, said pump comprising a pump cylinder, a conduit connecting said cylinder with said bearing, a plunger reciprocable in said cylinder, means for reciprocating said plunger, comprising a second shaft, clutch means for connecting said second shaft with said first named shaft, and means controlled by said second shaft for effecting communication between the crank case of said engine and said cylinder and for relieving the pressure in said conduit.

10. The combination with an automotive vehicle comprising a chassis having a bearing to be lubricated, an engine mounted on said chassis, and a shaft driven by said engine, of a pump for supplying lubricant to said bearing, said pump comprising a pump cylinder, a conduit connecting said cylinder with said bearing, a plunger reciprocable in said cylinder, means for reciprocating said plunger, comprising a second shaft, clutch means for connecting said second shaft with said first named shaft, and means controlled by said second shaft for effecting communication between the crank case of said engine and said cylinder.

11. The combination with an automotive vehicle comprising a chassis having a bearing to be lubricated, an engine mounted on said chassis, and a shaft driven by said engine, of a pump for supplying lubricant to said bearing, said pump comprising a pump cylinder, a conduit connecting said cylinder with said bearing, a plunger reciprocable in said cylinder, means for reciprocating said plunger, comprising a second shaft, clutch means for connecting said second shaft with said first named shaft, and means controlled by said second shaft for relieving the pressure in said conduit.

12. A lubricating pump comprising a supply chamber, a pump cylinder communicating with said supply chamber, a plunger reciprocable in said pump cylinder, a shaft rotatably and reciprocably mounted in the walls of said pump cylinder, a cam on said shaft for actuating said plunger, and means whereby said shaft can be reciprocated, said shaft having an annular groove formed therein for establishing communication between two portions of a passageway formed in a wall of said supply chamber.

13. A lubricating pump comprising a supply chamber, a pump cylinder communicating with said supply chamber, a plunger reciprocable in said pump cylinder, a shaft rotatably and reciprocably mounted in the walls of said pump cylinder, a cam on said shaft for actuating said plunger, and means whereby said shaft can be reciprocated.

14. A lubricating system comprising a pump, and means for supplying oil to said pump, said pump including two by-passes for connecting the discharge side of said pump with said supply chamber, a spring-loaded valve controlling the return of oil from said pump to said supply chamber through one of said by-passes, and a manually controllable valve for controlling the return of oil from said pump to said supply chamber through the other of said by-passes.

15. A lubricating system comprising a pump, and means for supplying oil to said pump, said pump including two by-passes for connecting the discharge side of said pump with said supply chamber, a valve controlling the return of oil from said pump to said supply chamber through one of said by-passes, and a second valve for controlling the return of oil from said pump to said supply chamber through the other of said by-passes.

16. A lubricating system comprising a bearing, a pump for supplying lubricant to said bearing, a driven member for operating said pump, manually operable means for rendering said pump driving member effective or ineffective, and means controlled by said last named means for relieving the pressure on the oil between said pump and bearing.

In witness whereof, I hereunto subscribe my name this 21st day of July, 1925.

OSCAR ULYSSES ZERK.